(12) United States Patent
Balaram

(10) Patent No.: US 10,949,082 B2
(45) Date of Patent: Mar. 16, 2021

(54) PROCESSING CAPACITIVE TOUCH GESTURES IMPLEMENTED ON AN ELECTRONIC DEVICE

(71) Applicant: Apple Inc., Cupertino, CA (US)

(72) Inventor: Haran Balaram, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/403,370

(22) Filed: May 3, 2019

(65) Prior Publication Data

US 2019/0258395 A1 Aug. 22, 2019

Related U.S. Application Data

(63) Continuation of application No. 15/257,713, filed on Sep. 6, 2016, now Pat. No. 10,324,620.

(51) Int. Cl.
*G06F 3/0488* (2013.01)
*G04G 21/08* (2010.01)
(Continued)

(52) U.S. Cl.
CPC ......... *G06F 3/04883* (2013.01); *G04G 21/08* (2013.01); *G06F 1/163* (2013.01);
(Continued)

(58) Field of Classification Search
CPC ...... G06F 3/04883; G06F 1/163; G06F 3/044; G06F 3/0412; G04G 21/08
See application file for complete search history.

(56) References Cited

U.S. PATENT DOCUMENTS 4,566,001 A 1/1986 Moore et al.
4,896,370 A 1/1990 Kasparian et al.
(Continued)

FOREIGN PATENT DOCUMENTS

CN 1343330 A 4/2002
CN 1720499 A 1/2006
(Continued)

OTHER PUBLICATIONS

Final Office Action received for U.S. Appl. No. 12/486,710, dated Jan. 2, 2014, 30 pages.
(Continued)

*Primary Examiner* — Muhammad N Edun
(74) *Attorney, Agent, or Firm* — Kubota & Basol LLP

(57) ABSTRACT

Content on a display user interface of an electronic device, such as a wearable electronic device, can be manipulated using capacitive touch sensors that may be seamlessly integrated into the housing or strap of the electronic device. The capacitive touch sensors can advantageously replace mechanical buttons and other mechanical user interface components, such as a crown, to provide industrial design opportunities not possible with the inclusion of mechanical buttons and mechanical interface components. Moreover, the capacitive touch sensors can enable ambidextrous user interface control of content displayed on a touchscreen without requiring the user to touch the touchscreen. In some examples, content displayed on the touchscreen can be accessed in response to a variety of touch gestures processed by the capacitive touch sensors. The touch gestures can include, for example, single tap, double tap, extended touch, x-y coordinate selection, scrolling, scaling, or the like for manipulating a touchscreen user interface.

15 Claims, 15 Drawing Sheets

(51) Int. Cl.
*G06F 1/16* (2006.01)
*G06F 3/041* (2006.01)
*G06F 3/0485* (2013.01)
*G06F 3/0354* (2013.01)
*G06F 3/0484* (2013.01)

(52) U.S. Cl.
CPC .......... *G06F 3/03547* (2013.01); *G06F 3/041* (2013.01); *G06F 3/0485* (2013.01); *G06F 3/04842* (2013.01); *G06F 3/04855* (2013.01); *G06F 3/04886* (2013.01); *G06F 2203/0339* (2013.01); *G06F 2203/04806* (2013.01)

(56) References Cited

U.S. PATENT DOCUMENTS

| | | | |
|---|---|---|---|
| 6,131,047 | A | 10/2000 | Hayes et al. |
| 6,297,811 | B1 | 10/2001 | Kent et al. |
| 6,413,233 | B1 | 7/2002 | Sites et al. |
| 6,597,384 | B1 | 7/2003 | Harrison |
| 6,888,532 | B2 | 5/2005 | Wong et al. |
| 6,909,424 | B2 | 6/2005 | Liebenow et al. |
| 7,109,978 | B2 | 9/2006 | Gillespie et al. |
| 7,145,552 | B2 | 12/2006 | Hollingsworth |
| 7,499,039 | B2 | 3/2009 | Roberts |
| 7,652,589 | B2 | 1/2010 | Autor |
| 7,932,893 | B1 | 4/2011 | Berthaud |
| 9,047,009 | B2 | 6/2015 | King et al. |
| 9,794,397 | B2 * | 10/2017 | Min ................... G04G 21/04 |
| 2001/0043189 | A1 | 11/2001 | Brisebois et al. |
| 2002/0015024 | A1 | 2/2002 | Westerman et al. |
| 2003/0011574 | A1 | 1/2003 | Goodman |
| 2003/0043174 | A1 | 3/2003 | Hinckley et al. |
| 2004/0012572 | A1 | 1/2004 | Sowden et al. |
| 2005/0146509 | A1 | 7/2005 | Geaghan et al. |
| 2006/0238517 | A1 | 10/2006 | King et al. |
| 2008/0211772 | A1 | 9/2008 | Loucks |
| 2009/0059730 | A1 | 3/2009 | Lyons et al. |
| 2009/0236648 | A1 | 9/2009 | Maeda et al. |
| 2010/0112964 | A1 | 5/2010 | Yi et al. |
| 2010/0164878 | A1 | 7/2010 | Bestle et al. |
| 2012/0075238 | A1 | 3/2012 | Minami et al. |
| 2012/0099406 | A1 | 4/2012 | Lau et al. |
| 2014/0171156 | A1 | 6/2014 | Pattikonda et al. |
| 2014/0375577 | A1 | 12/2014 | Yeh et al. |
| 2015/0002440 | A1 | 1/2015 | Huang et al. |
| 2015/0091790 | A1 | 4/2015 | Forutanpour et al. |
| 2015/0111558 | A1 * | 4/2015 | Yang ................ H04M 1/72569 455/418 |
| 2015/0186092 | A1 | 7/2015 | Francis et al. |
| 2015/0261310 | A1 | 9/2015 | Walmsley et al. |
| 2015/0261362 | A1 | 9/2015 | King et al. |
| 2015/0346026 | A1 | 12/2015 | Maass et al. |
| 2016/0170598 | A1 | 6/2016 | Zambetti et al. |
| 2016/0174025 | A1 | 6/2016 | Chaudhri et al. |
| 2017/0068352 | A1 | 3/2017 | Blondin et al. |
| 2017/0336964 | A1 * | 11/2017 | Kim ................... G06F 3/04883 |
| 2018/0059809 | A1 * | 3/2018 | McClendon .......... G06F 3/0416 |
| 2018/0067639 | A1 | 3/2018 | Balaram |

FOREIGN PATENT DOCUMENTS

| | | |
|---|---|---|
| EP | 1505484 A1 | 2/2005 |
| EP | 1571537 A1 | 9/2005 |
| WO | 00/55716 A1 | 9/2000 |
| WO | 2007/103631 A2 | 9/2007 |
| WO | 2015034966 A1 | 3/2015 |

OTHER PUBLICATIONS

Final Office Action received for U.S. Appl. No. 12/486,710, dated Jul. 1, 2011, 20 pages.
Final Office Action received for U.S. Appl. No. 12/486,710, dated Sep. 4, 2012, 25 pages.
Final Office Action received for U.S. Appl. No. 14/724,753, dated Nov. 25, 2016, 16 pages.
International Search Report received for PCT Patent Application No. PCT/US2007/062474, dated Jan. 3, 2008, 3 pages.
Non-Final Office Action received for U.S. Appl. No. 11/426,078, dated Apr. 2, 2009, 22 pages.
Non-Final Office Action received for U.S. Appl. No. 12/486,710, dated Aug. 25, 2014, 29 pages.
Non-Final Office Action received for U.S. Appl. No. 12/486,710, dated Jun. 6, 2013, 29 pages.
Non-Final Office Action received for U.S. Appl. No. 12/486,710, dated Mar. 9, 2011, 14 pages.
Non-Final Office Action received for U.S. Appl. No. 12/486,710, dated Mar. 28, 2012, 25 pages.
Non-Final Office Action received for U.S. Appl. No. 14/724,753, dated Apr. 20, 2016, 16 pages.
Non-Final Office Action received for U.S. Appl. No. 14/724,753, dated Jun. 22, 2017, 9 pages.
Non-Final Office Action received for U.S. Appl. No. 15/257,713, dated Oct. 17, 2018, 9 pages.
Non-Final Office Action received for U.S. Appl. No. 16/529,690, dated Apr. 6, 2020, 17 pages.
Notice of Allowance received for U.S. Appl. No. 11/426,078, dated Sep. 25, 2009, 14 pages.
Notice of Allowance received for U.S. Appl. No. 12/486,710, dated Jan. 29, 2015, 5 pages.
Notice of Allowance received for U.S. Appl. No. 14/724,753, dated Jan. 24, 2018, 9 pages.
Notice of Allowance received for U.S. Appl. No. 15/257,713, dated Feb. 21, 2019, 7 pages.
Notice of Allowance received for U.S. Appl. No. 15/970,571, dated Apr. 5, 2019, 10 pages.
Pre-interview First Office Action received for U.S. Appl. No. 15/257,713, dated May 9, 2018, 5 pages.
Extended Search Report received for European Patent Application No. 09170572.3, dated Nov. 7, 2013, 8 pages.
Notice of Allowance received for U.S. Appl. No. 16/529,690, dated Oct. 20, 2020, 8 pages.

* cited by examiner

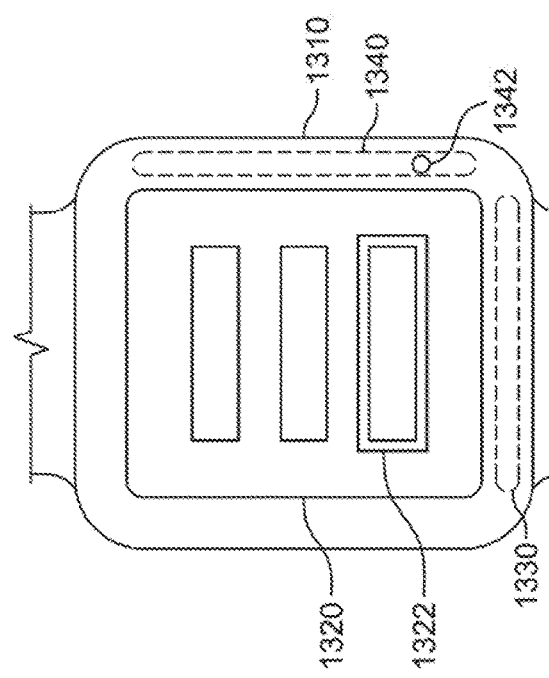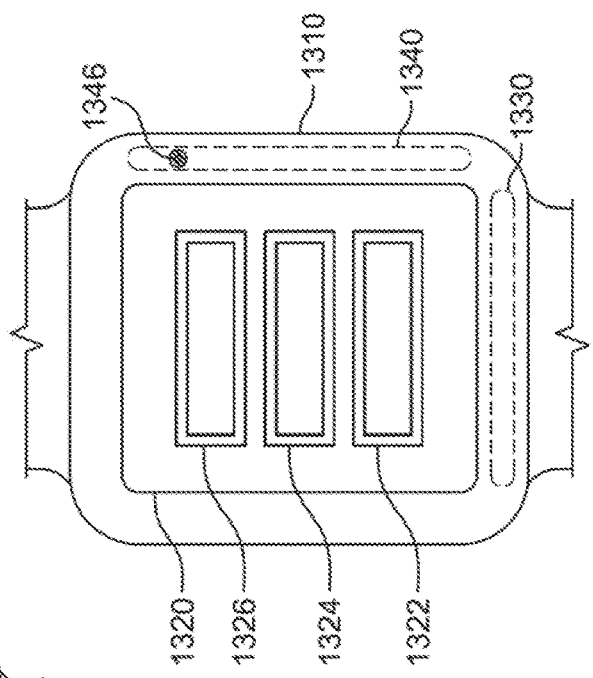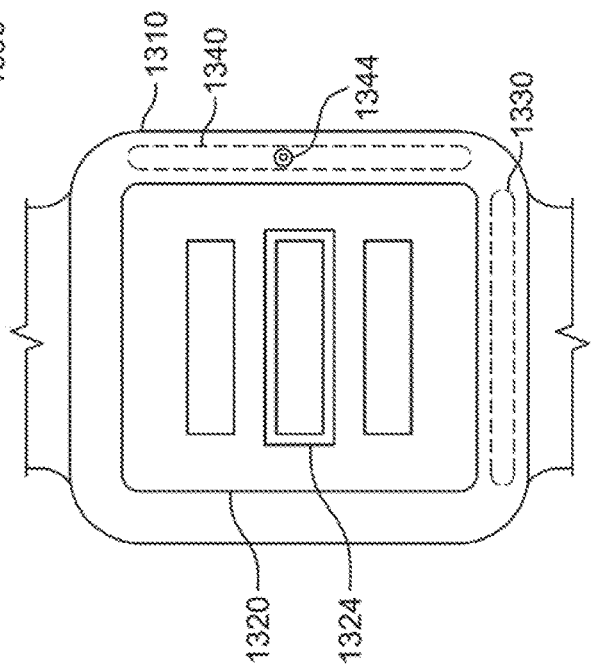

PROCESSING CAPACITIVE TOUCH GESTURES IMPLEMENTED ON AN ELECTRONIC DEVICE

CROSS-REFERENCE TO RELATED APPLICATION(S)

This is a continuation of U.S. patent application Ser. No. 15/257,713, filed 6 Sep. 2016, and titled "PROCESSING CAPACITIVE TOUCH GESTURES IMPLEMENTED ON AN ELECTRONIC DEVICE," the disclosure of which is hereby incorporated by reference herein in its entirety.

FIELD

This generally relates to electronic devices and, more particularly, to capacitive touch interfaces for electronic devices.

BACKGROUND

Advanced personal electronic devices can have small form factors. These personal electronic devices can include, but are not limited to, tablets and smart phones. Use of such personal electronic devices involves manipulation of user interface objects on display screens that also have small form factors to complement the design of the personal electronic devices. Existing methods for manipulating user interface objects on reduced-size touch-sensitive displays can be inefficient. Further, existing methods generally provide less precision than is preferable.

SUMMARY

The present disclosure relates to manipulating a user interface on a wearable electronic device using capacitive touch sensors that are seamlessly integrated into the housing or strap or band assembly of the wearable electronic device. The capacitive touch sensors can advantageously replace mechanical buttons and other mechanical user interface components, such as a crown, to provide industrial design opportunities not possible with the inclusion of mechanical buttons and mechanical interface components. Moreover, the capacitive touch sensors can enable ambidextrous user interface control of content displayed on a touchscreen user interface without requiring the user to touch the touchscreen. In some examples, content displayed on the touchscreen can be controlled in response to a variety of touch gestures processed by the capacitive touch sensors. The touch gestures can include, for example, single tap, double tap, extended touch, x-y coordinate selection, scrolling, scaling, or other suitable gestures for controlling the touchscreen user interface.

In one embodiment, a wearable electronic device is provided that can include a housing, a processor positioned within the housing, a display exposed through an opening of the housing, and a capacitive interface region provided by the housing, wherein the capacitive interface region extends adjacent to at least a majority of a side of the display and the processor is configured to process user inputs received along the capacitive interface region.

In another embodiment, a method may be implemented in an electronic device including a processor, a display, and a housing providing a capacitive interface region along a path adjacent to a portion of a periphery of the display, wherein a shape of the path is the same as a shape of the portion of the periphery of the display. The method may include displaying content on the display, receiving a user input via the capacitive interface region, and altering a display of the content on the display in response to the received user input.

In yet another embodiment, a watch apparatus is provided that can include a processor, a display operatively coupled to the processor, a housing protecting the processor and exposing a portion of the display defined by a periphery, a plurality of capacitive touch interface regions provided by the housing such that the plurality of capacitive touch interface regions collectively extend adjacent to a majority of the periphery of the display, and a plurality of capacitive touch sensors contained within the housing, wherein each capacitive touch sensor of the plurality of capacitive touch sensors is associated with a respective capacitive touch interface region of the plurality of capacitive touch interface regions and is communicatively coupled to the processor and the processor is operative to process user touch events on the plurality of capacitive touch interface regions via the plurality of capacitive touch sensors and alter display of content on the display in response to the processed user touch events.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters refer to like parts throughout, and in which:

FIGS. 13A-13C show illustrative screen shots of displayed content being navigated in response to user input touch events on one or two capacitive interface regions of an exemplary electronic device according to various embodiments.

DETAILED DESCRIPTION

In the following detailed description, for purposes of explanation, numerous specific details are set forth to provide a thorough understanding of the various embodiments described herein. Those of ordinary skill in the art will realize that these various embodiments are illustrative only and are not intended to be limiting in any way. Other embodiments will readily suggest themselves to such skilled persons having the benefit of this disclosure.

In addition, for clarity purposes, not all of the routine features of the embodiments described herein are shown or described. One of ordinary skill in the art will readily appreciate that in the development of any such actual embodiment, numerous embodiment-specific decisions may be required to achieve specific design objectives. These design objectives will vary from one embodiment to another and from one developer to another. Moreover, it will be appreciated that such a development effort might be complex and time-consuming, but would nevertheless be a routine engineering undertaking for those of ordinary skill in the art having the benefit of this disclosure.

The present disclosure relates to manipulating a user interface on an electronic device using capacitive touch sensors that may be seamlessly integrated into the housing or other structures of the electronic device. In some embodiments, a capacitive touch sensor can be integrated in a strap or band assembly or cover associated with the device. The capacitive touch sensors can enable ambidextrous user interface control of content displayed on a touchscreen user interface without requiring the user to touch the touchscreen. This advantageously enables a user to interact with content on the screen without having to block or obscure his or her view of that content by physically touching the screen. In some examples, content displayed on the touchscreen can be accessed in response to a variety of touch gestures processed by the capacitive touch sensors. The touch gestures can include, for example, single tap, double tap, extended touch, x-y coordinate selection, scrolling, scaling, or other suitable gestures for controlling the touchscreen user interface. It will be appreciated that although many embodiments discussed herein are made in reference to a wearable device, such as a watch, such embodiments may also be used in connection with other electronic devices such as smart phones, tablets, laptops, desktops, and the like. Moreover, it will be appreciated that although many embodiments discussed herein are made in reference to a device with a touchscreen display, such embodiments may also be used in connection with devices that have displays that are not equipped to detect touch events on the displays.

Figure 1:
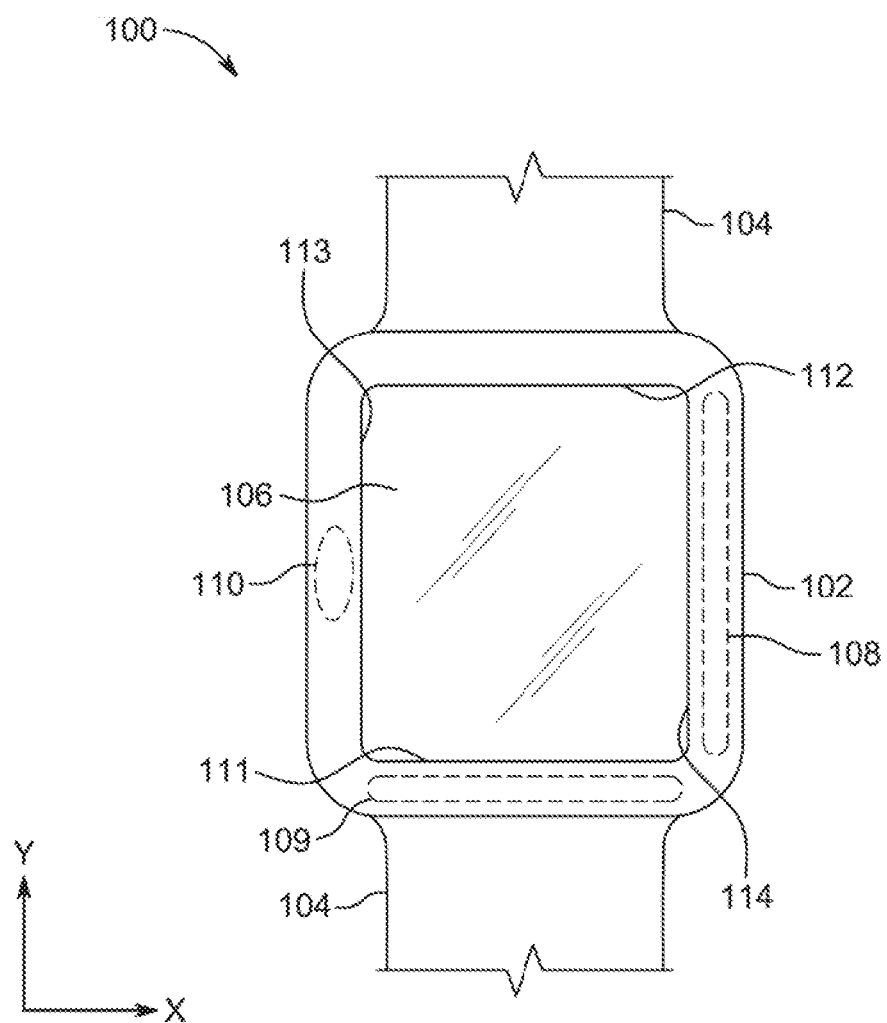
FIG. 1 illustrates a front view of an exemplary wearable electronic device according to various embodiments.

FIG. 1 illustrates exemplary personal electronic device 100. In the illustrated example, device 100 is a watch that generally includes housing 102 and band assembly or strap 104 for affixing device 100 to the body of a user. That is, device 100 is wearable. Housing 102 can be designed to couple with straps 104. Device 100 can have touch-sensitive display screen (hereafter touchscreen) 106 and capacitive interface regions 108-110 provided by regions of housing 102. Device 100 may be devoid of any buttons or other mechanical user interface component that extend outwardly from an outer surface of housing 102. Eliminating buttons and/or mechanical user interface components can simplify construction of device 100, as there is no need to accommodate such structures, which can result in integration of other components such as a larger battery, a bigger speaker, or a larger haptic mechanism. In addition, eliminating buttons and/or mechanical user interface components can enable industrial design choices that result in a relatively clean look that does not have members protruding from the outer surface of housing 102. Housing 102 may take any suitable shape, including, for example, a rectangular cuboid shape or a cylindrical shape.

Capacitive interface regions 108-110 may be regions of housing 102 in which a user can perform touch gestures on housing 102 to interact with content displayed on touchscreen 106 without having to touch touchscreen 106. Capacitive interface regions 108-110 can occupy different sized areas on housing 102. In some embodiments, capacitive interface regions 108-110 can mimic a contour of housing 102 and/or a shape of at least a portion of a border or edge or side or periphery of touchscreen 106. For example, capacitive interface region 108, which may be provided by a portion of a front face or surface of housing 102 positioned to the right of touchscreen 106, may span adjacent to the length of the right touchscreen border or edge or side or periphery 114 of touchscreen 106 along the y-axis from bottom touchscreen border or edge or side or periphery 111 to top touchscreen border or edge or side or periphery 112. In some embodiments, the span length of capacitive region 108 may be exactly the same as the length of right touchscreen edge 114 of touchscreen 106, larger than the length of right touchscreen edge 114 of touchscreen 106, or smaller than the length of right touchscreen edge 114 of touchscreen 106, but greater than at least fifty percent of the touchscreen length of right touchscreen edge 114, or may otherwise extend adjacent to a majority of a side or edge of the touchscreen. The shape of the path along which capacitive region 108 is provided by the top surface of housing 102 may mimic or otherwise follow or share the shape of the portion or entirety of right touchscreen edge or side or periphery portion 114 of touchscreen 106 that extends adjacent to capacitive region 108 (e.g., a substantially linear shape). Capacitive interface region 109, which may be provided by a portion of the front surface of housing 102 positioned below touchscreen 106, may span adjacent to the width of the bottom touchscreen edge 111 of touchscreen 106 along the x-axis from left touchscreen edge portion 113 to right touchscreen edge portion 114. In some embodiments, the span length of capacitive region 109 may be exactly the same as the width of bottom touchscreen edge 111 of touchscreen 106, larger than the width of bottom touchscreen edge 111 of touchscreen 106, or smaller than the width of bottom touchscreen edge 111 of touchscreen 106, but greater than at least fifty percent of the touchscreen width of bottom touchscreen edge 111, or may otherwise extend adjacent to a majority of a side or edge of the touchscreen. The shape of the path along which capacitive region 109 is provided by the top surface of housing 102 may mimic or otherwise follow or share the shape of the portion or entirety of bottom touchscreen edge or side or periphery portion 111 of touchscreen 106 that extends adjacent to capacitive region 109 (e.g., a substantially linear shape). Capacitive interface region 110, which may be provided by a portion of the front surface of housing 102 positioned left of touchscreen 106, may be sized in the approximate shape of a mechanical button (e.g., sized for receiving an interaction with a fingertip of a user). If desired, multiple "button-shaped" regions 110 may be aligned adjacent to the left side of touchscreen 106. Further, housing 102, which can include a bezel, may have indicia or tactile indicators (e.g., a detent or braille dot) on the bezel to illustrate the position of regions 108-110.

Capacitive interface regions 108-110, collectively, can extend along at least twenty-five percent of a periphery (e.g., collective edges) of touchscreen 106. In some embodiments, capacitive interface regions 108-110, collectively, can extend along at least thirty, forty, fifty, sixty, seventy, eighty, or ninety percent of a periphery of touchscreen 106. In another embodiment, capacitive interface regions 108-110 may collectively surround a majority or the entirety of a periphery of touchscreen 106.

Capacitive touch sensors (not shown) may be associated with each of capacitive interface regions 108-110. For example, a capacitive touch sensor can be positioned on an inner surface of housing 102 or within housing 102 in close proximity to its respective capacitive interface region. When housing 102 is constructed from a non-metallic material, such as plastic, glass, ceramic, or zirconia, a capacitive sensor may be placed directly onto the inner surface of the housing portion providing an associated capacitive interface region. An example of the direct application is shown and discussed in more detail below in connection with FIG. 4A. When housing 102 is constructed from a metal, such as steel or aluminum, a capacitive touch sensor may not be directly applied to the inner surface of the metal housing portion providing an associated capacitive interface region. A non-capacitive structure may be placed between the inner surface of the metal housing portion and the capacitive sensor to enable touch gestures according to various embodiments. An example of a non-capacitive structure is shown and discussed in more detail below in connection with FIG. 4B.

Display 106 can include any suitable display device, such as a liquid crystal display (LCD), light-emitting diode (LED) display, organic light-emitting diode (OLED) display, or the like, positioned partially or fully behind or in front of a touch sensor panel implemented using any desired touch sensing technology, such as mutual-capacitance touch sensing, self-capacitance touch sensing, resistive touch sensing, projection scan touch sensing, or the like. Display 106 can allow a user to perform various functions by touching over hovering near the touch sensor panel using one or more fingers or other objects.

In some examples, device 100 can further include one or more pressure sensors (not shown) for detecting an amount of force or pressure applied to the display. The amount of force or pressure applied to display 106 can be used as an input to device 100 to perform any desired operation, such as making a selection, entering or exiting a menu, causing the display of additional options/actions, or the like. In some examples, different operations can be performed based on the amount of force or pressure being applied to display 106. The one or more pressure sensors can further be used to determine a position on which a force is being applied to display 106.

Figure 2:
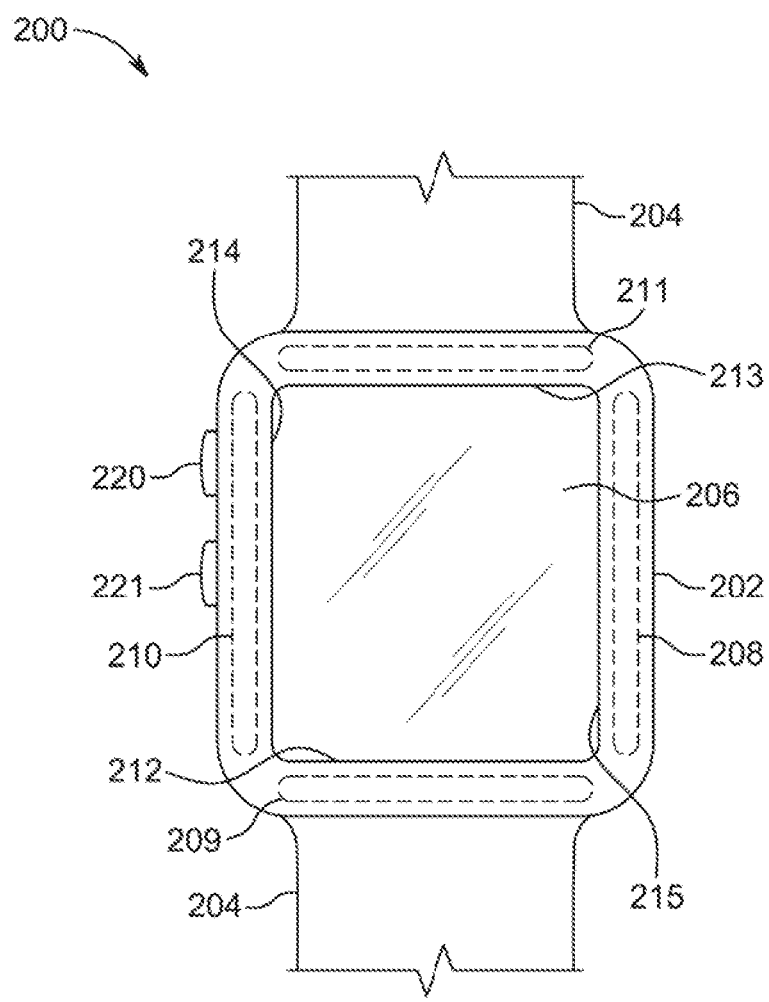
FIG. 2 illustrates a front view of another exemplary wearable electronic device according to various embodiments.

FIG. 2 illustrates exemplary personal electronic device 200. Device 200 is similar to device 100, but includes different capacitive interface regions and mechanical buttons, and thus like reference features discussed above in connection with FIG. 1 apply to FIG. 2. Device 200 can be a watch that can includes housing 202, strap 204, touchscreen 206, and capacitive interface regions 208-211 of housing 202, and mechanical buttons 220 and 221. Capacitive interface regions 208 and 210 are provided along the front surface of housing 202 at portions to the right of right touchscreen edge 215 and to the left of left touchscreen edge 214 of touchscreen 206, respectively, and can span from bottom touchscreen edge 212 to top touchscreen edge 213. Capacitive interface regions 209 and 211 are provided along the front surface of housing 202 at portions below bottom touchscreen edge 212 and above top touchscreen edge 213 of touchscreen 206, respectively, and can span from left touchscreen edge 214 to right touchscreen edge 215. Including capacitive interface regions adjacent each one of on all four edges of touchscreen 206, housing 202 may enable device 200 to be ambidextrous. That is, if the user wears device 200 on his left arm, he may be more inclined to input touch gestures via capacitive interface regions 208 and 209 than via regions 210 and 211. However, if the user wears device 200 on his right wrist, he may prefer using capacitive interface regions 210 and 211 than regions 208 and 209 to input touch gestures. Regardless of which arm the device is worn, the additional capacitive interface regions may provide the user the option to use whichever regions he or she desires or all regions.

Buttons 220 and 221 may be provided, for example, to enable a user to access various content, adjust volume, reset the device, and/or the like. In one embodiment, button 221 may be placed on the other side of device 200. In yet another embodiment, button 221 may be eliminated and button 220 may reside on a back surface of housing 202 and may require a pen or sharp point for button access.

Figure 3:
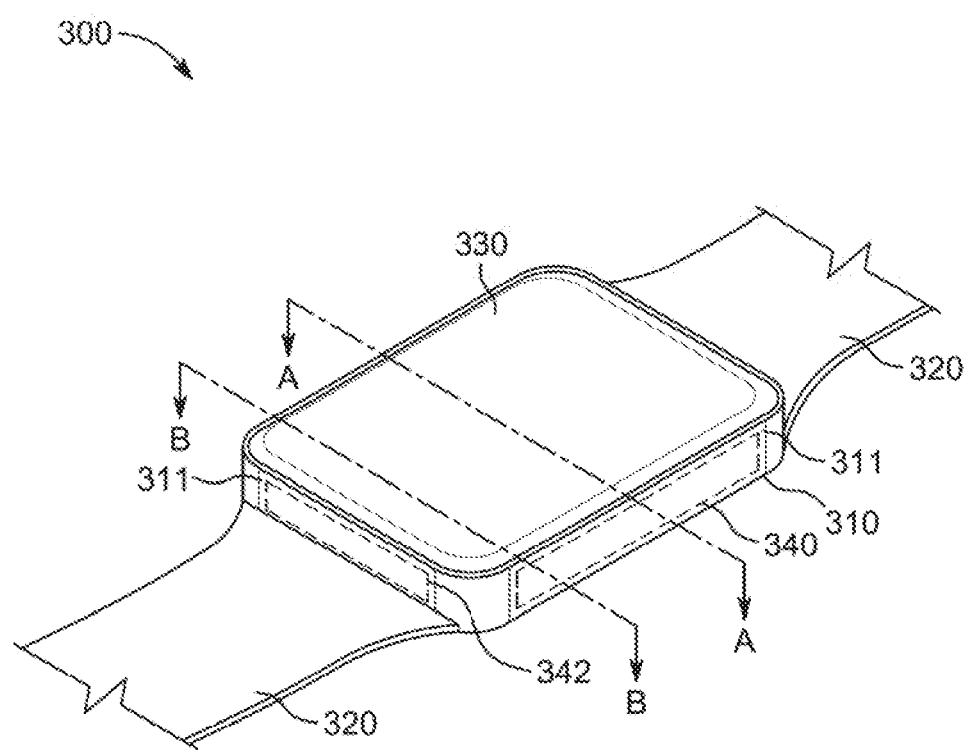
FIG. 3 illustrates a perspective view of yet another exemplary wearable electronic device according to various embodiments.

FIG. 3 illustrates an exemplary perspective view of a wearable electronic device 300 according to various embodiments. Device 300 can be a watch that can includes housing 310, strap 320, touchscreen 330, and capacitive interface regions 340 and 342 of housing 310. Housing 310 can be substantially a rectangular cuboid in shape, but it should be appreciated that any suitable shape may be used (e.g., cylindrical (see, e.g., housing 502 of FIG. 5)). Housing 310 can have outer surface 311 and an inner surface (not shown in FIG. 3). Outer surface 311 may have several portions, depending on its shape. For example, the rectangular cuboid shape of housing 310 may have six faces, including a front face through which touchscreen 330 may be exposed, a back face opposite the front face, and four side faces, each one of which may extend between an edge of the front face and an edge of the back face, such as a top face extending between a top edge of the front face and a top edge of the back face, a bottom face extending between a bottom edge of the front face and a bottom edge of the back face, a right face extending between a right edge of the front face and a right edge of the back face, and a left face extending between a left edge of the front face and a left edge of the back face. Only the front, right, and bottom faces of such faces are shown in FIG. 3. Capacitive interface region 340 may be provided by the right face of outer surface 311 and capacitive interface region 342 may be provided by the bottom face of outer surface 311. Additional capacitive interface regions may be provided by the other faces not shown in FIG. 3. The size of each one of capacitive interface regions 340 and 342 may be approximately the same as the dimensions of its associated face. For example, the size of capacitive interface region 340 may extend along the right face of outer surface 311, along a majority of the length of the right edge of the front face that may be along the entirety of the right edge or side or periphery portion of touchscreen 330 that may define a length of touchscreen 330, As another example, the size of capacitive interface region 342 may extend along the bottom face of outer surface 311, along a majority of the length of the bottom edge or side or periphery portion of the front face that may be along the entirety of the bottom edge of touchscreen 330 that may define a width of touchscreen 330. While the shape of the exposed surface of touchscreen 330 may be substantially rectangular and exposed through an opening in a substantially rectangular front face of housing 310, it is to be understood that the shape of the exposed surface of touchscreen 330 may be circular or any other suitable shape that need not match the shape of the front face of housing 310, while the shape of any capacitive interface region may mimic or extend along a path similar to the shape of an edge or side or periphery portion of the touchscreen and/or the shape of an edge or side or periphery portion of the front face of housing 310 or any other face of housing 310 that may provide that capacitive interface region.

Figure 4A:
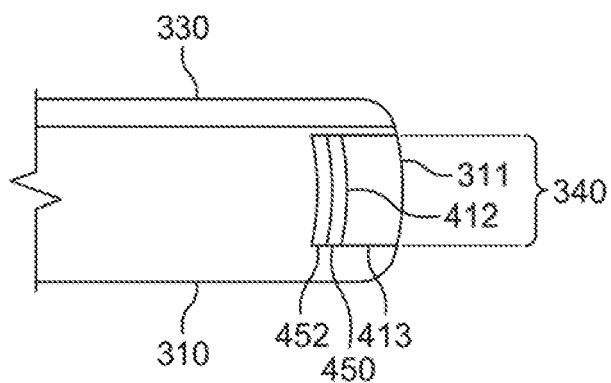
FIGS. 4A-4C show illustrative cross-sectional views of the wearable electronic device of FIG. 3, according to various embodiments.
Figure 4B:
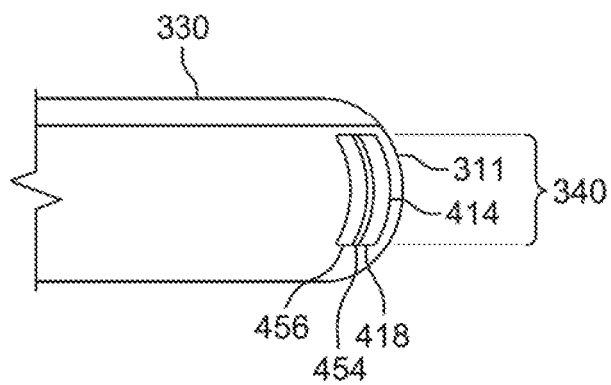
Figure 4C:
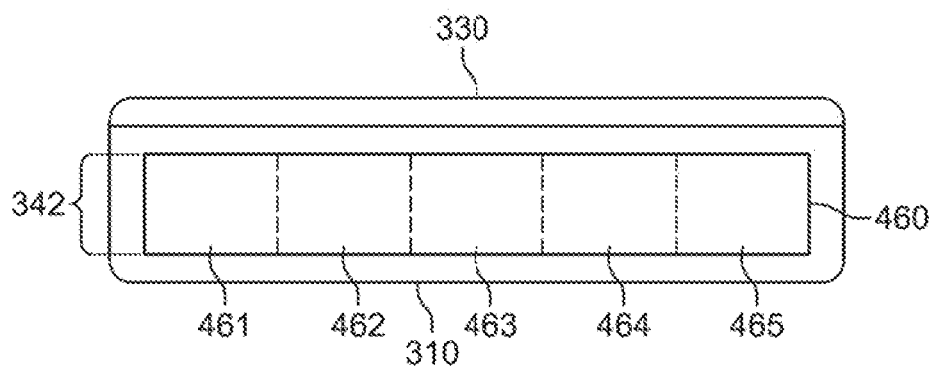

FIGS. 4A-4C show illustrative cross-sectional views of electronic device 300 of FIG. 3. In particular, FIG. 4A shows an illustrative cross-sectional view of device 300 taken along line A-A of FIG. 3. An assumption made in FIG. 4A is that housing 310 is constructed from a non-metallic material. Housing 310 has outer surface 311 and inner surface 412. Region 413 can represent a thickness of a portion of housing 310 providing a capacitive touch interface region (e.g., region 340). Capacitive touch sensor 450 may be positioned adjacent to inner surface 412 and can be supported by substrate 452. Note that a height of capacitive sensor 450 may approximate the height of the face of outer surface 311 to provide a capacitive touch interface region (e.g., capacitive touch interface region 340).

FIG. 4B shows another illustrative cross-sectional view of device 300 taken along line A-A of FIG. 3. An assumption made in FIG. 4B is that housing 310 is constructed from a metal material. Housing 310 has outer surface 311 and inner surface 414. Non-capacitive component 418 is shown disposed adjacent to inner surface 414. Capacitive touch sensor 454 may be positioned adjacent to non-capacitive component 418 and can be supported by substrate 456. Non-capacitive component 418 may be constructed from a material that enables capacitive touch sensor 454 to sense touch events on a metal housing portion providing an associated capacitive interface region. Note that a height of capacitive sensor 454 may approximate the height of the face of outer surface 311 to provide a capacitive interface region (e.g., capacitive touch interface region 340).

FIG. 4C shows an illustrative cross-sectional view of device 300 taken along line B-B of FIG. 3. Capacitive touch sensor 460 is shown spanning from the left side of housing 310 to the right side of housing 310. Capacitive touch sensor 460 may be divided into sensor sections 461-465. Any number of sensor sections may be included in touch sensor 460. The sensor sections may enable a processor to determine a user touch location along sensor 460, a scrolling direction along sensor 460, and/or a speed of the scrolling direction along sensor 460. Any capacitive sensor may be provided using any suitable media, such as printed ink, copper, indium tin oxide ("ITO"), and/or the like, on printed circuit boards, flexible material, and/or the like, and may be provided as a self-or absolute-capacitance sensing system using surface capacitance and/or projected capacitance touch technology.

Figure 5:
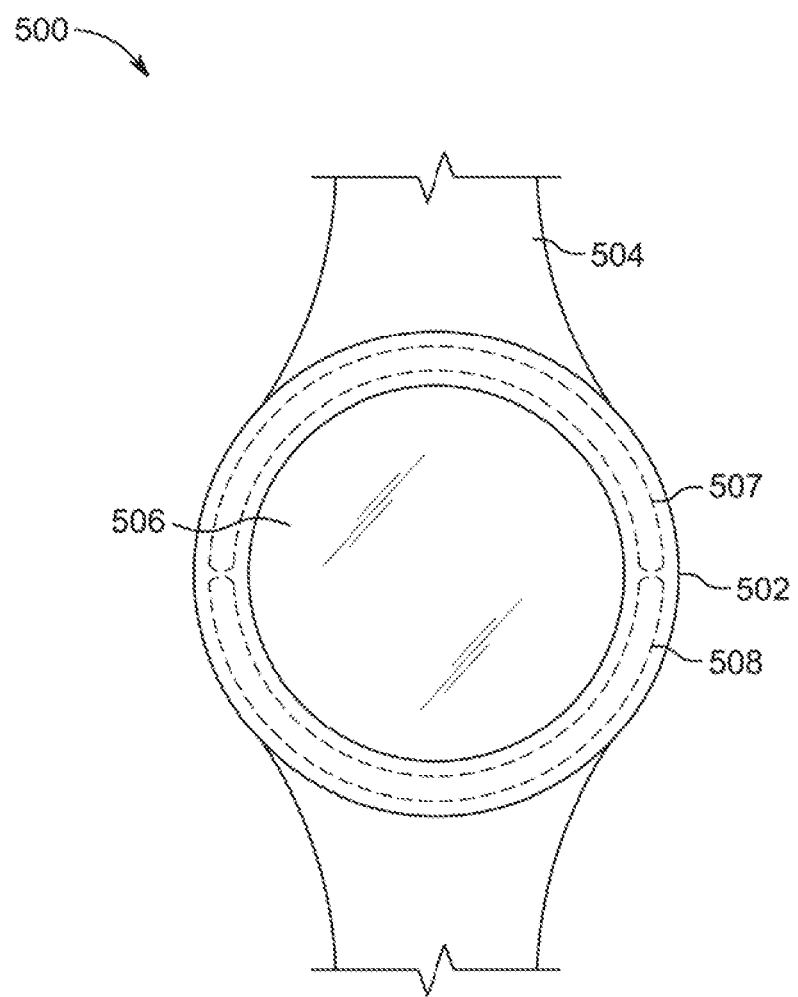
FIG. 5 illustrates a front view of yet another exemplary wearable electronic device according to various embodiments.

FIG. 5 illustrates exemplary wearable electronic device 500 according to some embodiments. Device 500 can include housing 502, strap 504, touchscreen 506, and capacitive touch interface regions 507 and 508. Housing 502 has a substantially cylindrical shape and a circular touchscreen 506. Capacitive touch interface regions 507 and 508 may be provided by portions of a front face of housing 502 through which circular touchscreen 506 may be exposed. No matter the shape of the front face of housing 502, when touchscreen 506 is circular, one single capacitive touch interface region may be provided along that front face to surround or substantially surround the periphery of the circular touchscreen 506 in a circular or substantially circular path, or two or more capacitive touch interface regions provided along that front face may collectively substantially surround the circular touchscreen 506 in different arc segments (e.g., as shown by two capacitive touch interface regions 507 and 508 of FIG. 5 that may each be in a substantially semicircle arc path about half the periphery of the circular touchscreen 506), although the collective path of two or more capacitive touch interface regions may be about any suitable portion of the periphery of the circular touchscreen. The shape of the path along which capacitive region 507 is provided by the top face of housing 502 may mimic or otherwise follow or share the shape of the portion of the top circumference edge or side or periphery portion of circular touchscreen 506 that extends adjacent to capacitive region 507 (e.g., a curved or substantially semicircle arc path) and the shape of the path along which capacitive region 508 is provided by the top face of housing 502 may mimic or otherwise follow or share the shape of the portion of the bottom circumference edge or side or periphery portion of circular touchscreen 506 that extends adjacent to capacitive region 508 (e.g., a curved or substantially semicircle arc path). A curved side face or surface of a cylindrical housing 502 that may extend between circular front and back faces of a cylindrical housing may additionally or alternatively include one or more capacitive touch interface regions, each of which may be curved and provided along the curved side surface of the housing to follow the contours or shape of the curved side surface of housing 502. While the shape of the exposed surface of touchscreen 506 may be substantially circular and exposed through an opening in a substantially circular front face of housing 502, it is to be understood that the shape of the exposed surface of touchscreen 506 may be rectangular or any other suitable shape that need not match the shape of the circular front face of housing 502, while the shape of any capacitive interface region may mimic or extend along a path similar to the shape of an edge or side or periphery portion of the touchscreen and/or the shape of an edge or side or periphery portion of the front face of housing 502 or any other face of housing 502 (e.g., curved side face) that may provide that capacitive interface region. Only two touch interface regions are shown, but additional interface regions may be added. In another embodiment, a single touch interface region may circumnavigate the entire periphery (e.g., circumference) of touchscreen 506 on the front housing surface or the curved side housing surface.

Figure 6:
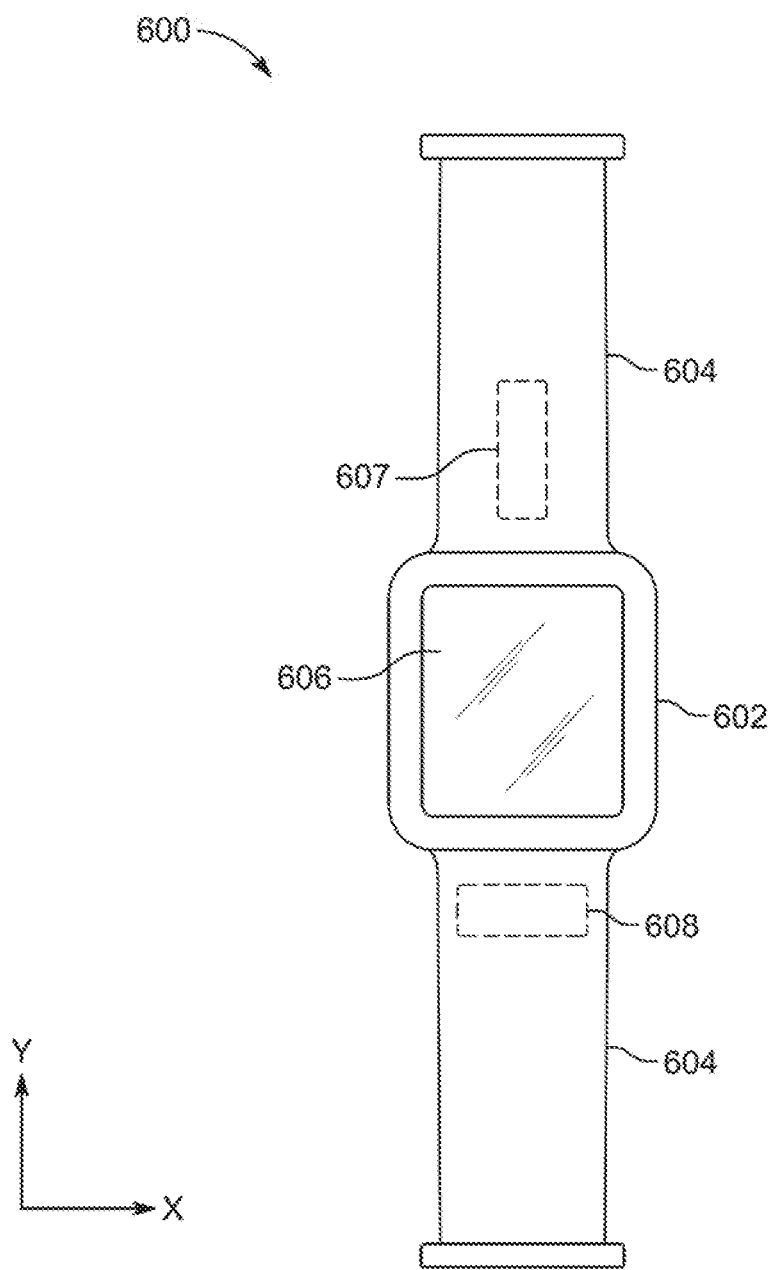
FIG. 6 illustrates a front view of yet another exemplary wearable electronic device according to various embodiments.

FIG. 6 illustrates exemplary wearable electronic device 600 according to some embodiments. Device 600 can include housing 602, body assembly or strap 604, touchscreen 606, and capacitive touch interface regions 607 and 608 of strap 604. Interface regions 607 and 608 are provided by strap 604, as opposed to housing 602. In some embodiments, other interface regions can also be provided by housing 602. Interface region 607 may be arranged to extend along a y-axis (e.g., perpendicular to a top touchscreen edge of rectangular touchscreen 606) and interface region 608 may be arranged to extend along an x-axis (e.g., parallel to a bottom touchscreen edge of rectangular touchscreen 606). These arrangements are only illustrative and any suitable arrangement may be used and additional interface regions may be placed on strap 604 or on housing 602, as desired.

Figure 7:
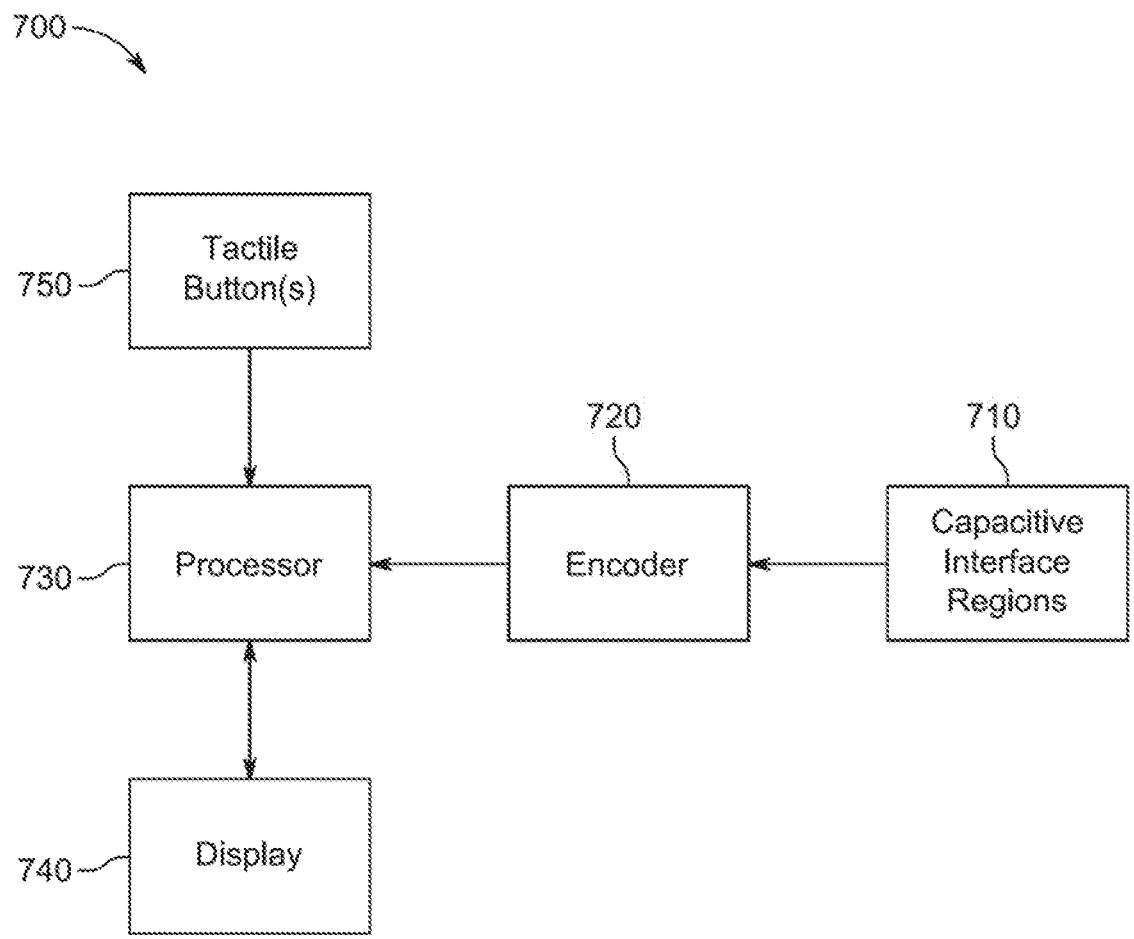
FIG. 7 illustrates a block diagram of some of components of an exemplary electronic device according to various embodiments.

FIG. 7 illustrates a block diagram of some of the components of a device 700, which may be similar to one or more of devices 100-300, 500, and 600, according to some embodiments. As shown, one or more capacitive interface regions 710 can be coupled to encoder 720, which can be configured to process touch events received on each interface region 710, and to provide electrical signals representative of the touch events to processor 730. Encoder 720 can be configured to process a variety of touch events on capacitive interface regions 710. Encoder 720 can detect single touch events, double touch events, extended touch events, scroll direction events and associated speed of the scroll (along one or more axes), multi-touch events (e.g., zoom and coordinate-based selections), and any other suitable touch events. Encoder 720 can sense the absolute touch position anywhere within an interface region. Encoder 720 can be configured to sense a direction of a touch event. Encoder 720 can be configured to detect a speed of touch events on regions 710 in any desired manner (e.g., velocity, acceleration, or the like) and can provide the speed information to processor 730. The speed can be expressed in numerous ways. For example, the speed can be expressed in a direction and a speed, such as hertz, as distance versus time, as a change in angle per unit of time, and the like. In alternative examples, instead of providing information to processor 730, this information can be provided to other components of device 700. While the examples described herein refer to the use of touch events on interface regions 710 to control user interaction with content on a screen, it should be appreciated that any other inputs derived from interface regions 710 can be used.

In some examples, the touch inputs received via interface regions 710 can control physical attributes of content displayed on display 740 of device 700. For example, if a user scrolls his finger in a y-axis direction along interface region 710, display 740 may show content being scrolled in the same y-axis direction of the user. In other words, the physical touch inputs received by interface regions 710 can represent physical modal functionality of display 740. In some examples, a temporal attribute of a user touch input on interface region 710 can be used as an input to device 700. For example, a fast change in touch inputs can be interpreted differently than a slow change in touch inputs.

Processor 730 can be further coupled to receive input signals from tactile or mechanical buttons 750 (e.g., button 220 of device 200), along with touch signals from touch-sensitive display 740, and/or signals received from a remote device such as a user's phone or laptop. Processor 730 can be configured to interpret these input signals and output appropriate display signals to cause an image to be produced by touch-sensitive display 740. While a single processor 730 is shown, it should be appreciated that any number of processors or other computational devices can be used to perform the general functions discussed above.

Figure 8:
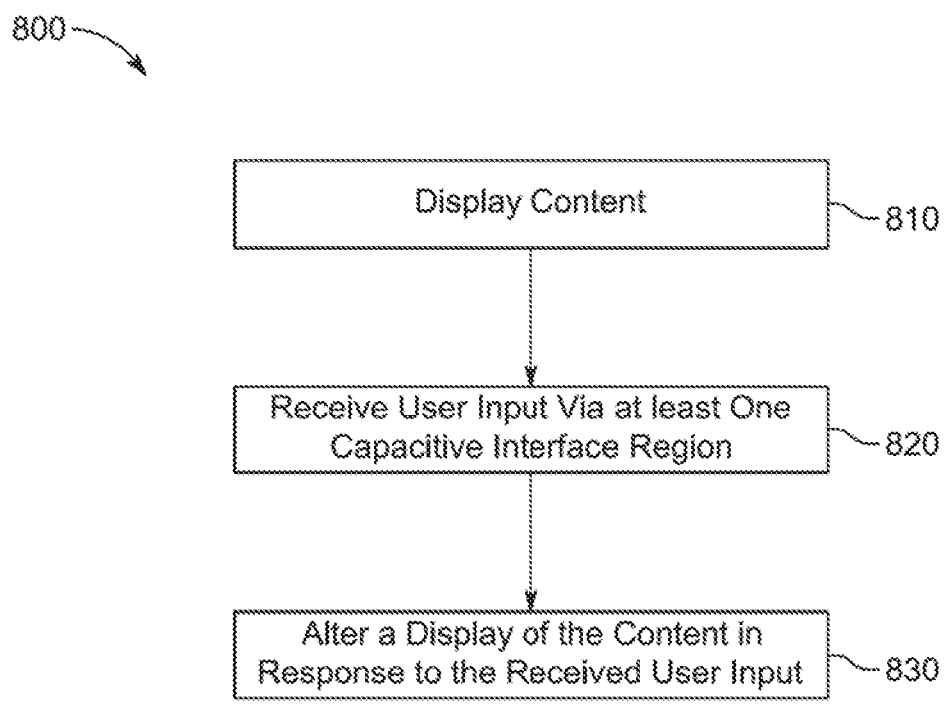
FIG. 8 shows an illustrative process for controlling a user interface according to various embodiments.

FIG. 8 shows an illustrative process 800 for controlling a user interface in accordance with some embodiments. In some examples, process 800 can be performed by a wearable electronic device similar to devices 100, 200, 300, 500, and 600 or any other suitable device. In these examples, a visual representation (e.g., icons, graphical images, textual images, and the like) of content elements may be displayed on a display (e.g., touchscreen 106, 206, 330, 506, or 606) and process 800 can be performed to alter the display of that content in response to user touch inputs received on capacitive interface regions. At step 810, content can be displayed on a display of a device (e.g., on a touchscreen display or non-touch sensitive display of a wearable electronic device). Any suitable content can be displayed, however, in a relatively small form factor size of a watch, the quantity and size of the content may be appropriately sized to account for the form factor.

At step 820, a user input can be received via at least one capacitive interface region. For example, the user input can be received via capacitive interface region 108 of device 100. Note that the user input is not being received via a touchscreen such as touchscreen 106 but rather by a capacitive sensor detecting input from a capacitive interface region of a device housing (e.g., a housing that may have an opening through which a touchscreen may be exposed). Any one a variety of different inputs may be received, many of which are discussed in more detail below in connection with FIGS. 9A-13C. At step 830, a display of the content is altered in response to the received user input (e.g., in response to and/or based on a processor processing the received user input). For example, if the received user input was a scroll, the content on the display may be scrolled in response thereto. Any other functionality of a device may be adjusted in response to the received user input, such as increasing or decreasing the volume of an audio output (e.g., based on horizontal x-axis dragging) or increasing or decreasing the brightness of visual output (e.g., based on vertical y-axis dragging).

It should be appreciated that the steps shown in FIG. 8 are only illustrative and that additional steps may be added, some steps may be omitted, and the order of the steps can be changed. For example, a step may be added to reject touch events that are determined to be aberrations or unintentional inputs.

Figure 9A:
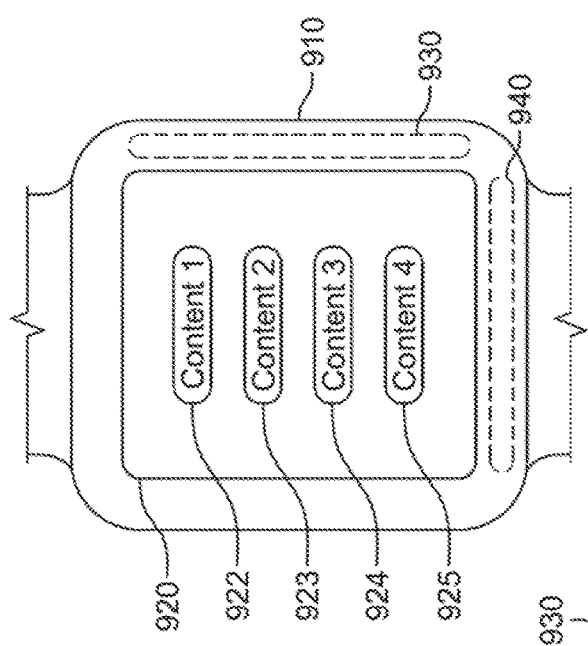
FIGS. 9A-9C show illustrative screen shots of displayed content being scrolled in accordance with a scroll gesture being received on a y-axis oriented capacitive interface region of an exemplary electronic device according to various embodiments.
Figure 9C:
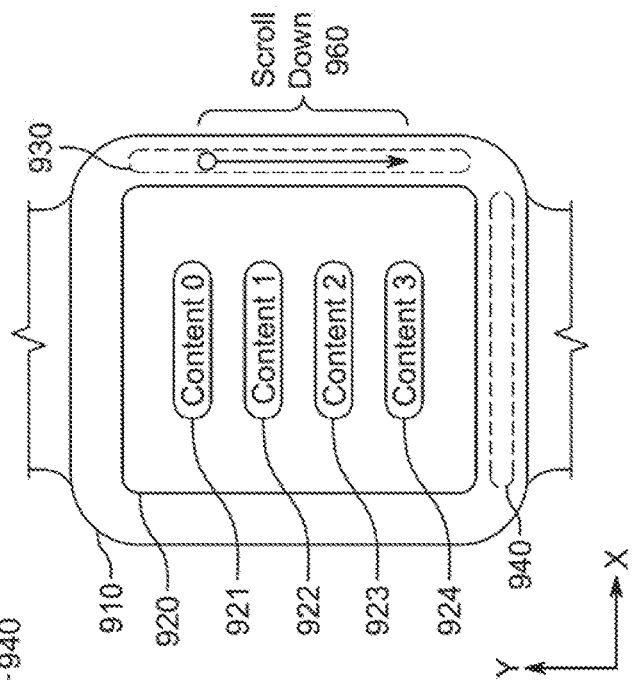
Figure 9B:
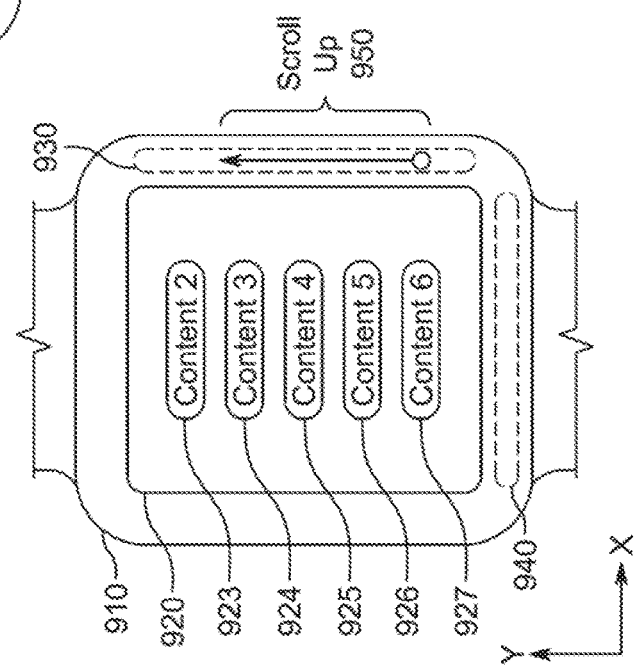

FIGS. 9A-9C show illustrative screen shots of content being scrolled in accordance with a scroll gesture being received on a y-axis oriented capacitive interface region of a device, according to various embodiments. Each of FIGS. 9A-9C shows housing 910, touchscreen 920, and capacitive touch regions 930 and 940 of housing 910. FIG. 9A can represent a starting point for content displayed on touchscreen 920. The content is illustrated as a list of content elements 922-925. FIG. 9B illustrates an alteration to the content of FIG. 9A in response to up-scrolling touch gesture 950 being received on capacitive touch region 930 that may extend adjacent to or parallel to a right edge of touchscreen 920. Up-scrolling touch gesture 950 can include a series of relatively fluid touch inputs from the user including a touch down event, in which the user initially touches a portion of region 930, and a drag event in which the user drags his finger along an axis (e.g., y-axis). Gesture 950 may also include a lift-off event if the user lifts his finger off region 930 anywhere during the drag event. The speed at which the drag event is processed may correlate to a speed in which content is scrolled on touchscreen 920. FIG. 9B shows that the elements have moved up such that element 922 is not shown, but elements 923-927 are displayed as a result of the up-scrolling gesture.

FIG. 9C illustrates an alteration to the content of FIG. 9A in response to down-scrolling touch gesture 960 being received on capacitive touch region 930. Down-scrolling touch gesture 960 can include a series of relatively fluid touch inputs from the user including a touch down event, in which the user initially touches a portion of region 930, a drag event, and optionally, a lift-off event if the user lifts his finger off region 930 anywhere during the drag event. FIG. 9C shows that the elements have moved down such that element 925 is no longer shown, but elements 921-924 are displayed as a result of the down-scrolling gesture.

Figure 10A:
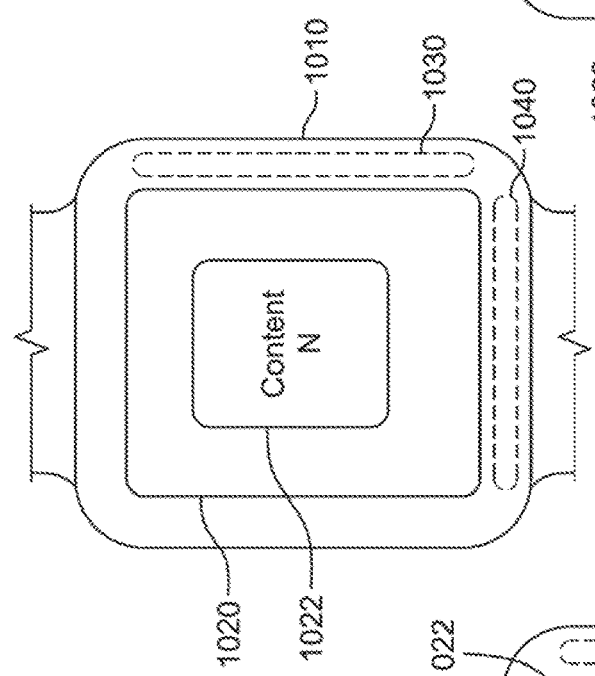
FIGS. 10A-10C show illustrative screen shots of displayed content being scrolled in accordance with a scroll gesture being received on an x-axis oriented capacitive interface region of an exemplary electronic device according to various embodiments.
Figure 10C:
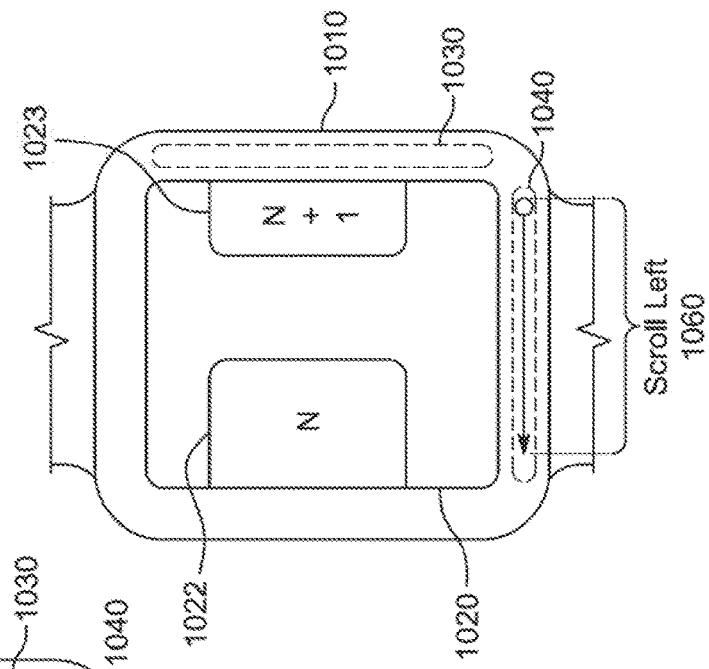
Figure 10B:
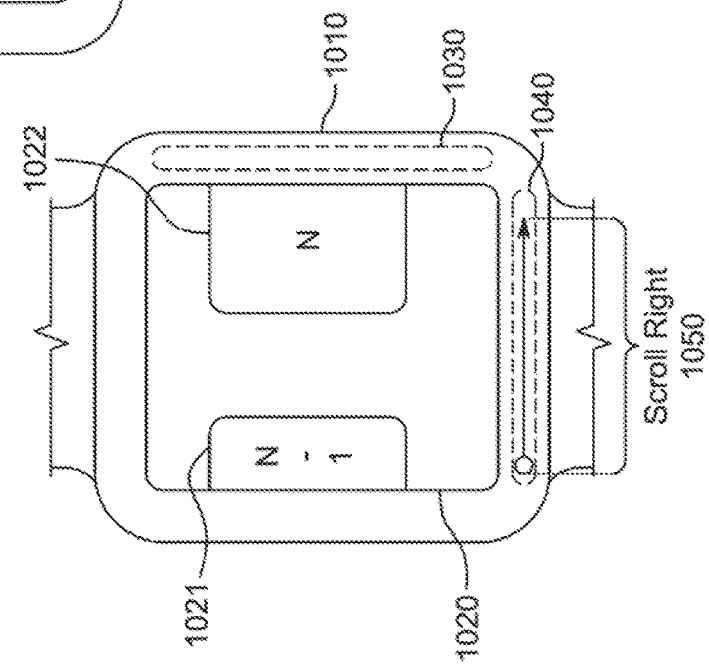

FIGS. 10A-10C show illustrative screen shots of content being scrolled in accordance with a scroll gesture being received on an x-axis oriented capacitive interface region of a device, according to various embodiments. Each of FIGS. 10A-10C shows housing 1010, touchscreen 1020, and capacitive touch regions 1030 and 1040 of housing 1010. FIG. 10A can represent a starting point for content displayed on touchscreen 1020. The content is illustrated as a single content element 1022. FIG. 10B illustrates an alteration to the content of FIG. 10A in response to right-scrolling touch gesture 1050 being received on capacitive touch region 1040 that may extend adjacent to or parallel to a bottom edge of touchscreen 1020. Right-scrolling touch gesture 950 can include a touch down event, a drag event, and an optional lift-off event. FIG. 9B shows that element 1022 moved to the right within touchscreen 1020 and a portion of element 1021 is displayed as a result of the right-scrolling gesture.

FIG. 10C illustrates an alteration to the content of FIG. 10A in response to left-scrolling touch gesture 1060 being received on capacitive touch region 1040. Left-scrolling touch gesture 1060 can include a series of relatively fluid touch inputs from the user including a touch down event, a drag event, and, optionally, a lift-off event if the user lifts his finger off region 1040 anywhere during the drag event. FIG. 10C shows that the elements have moved to the left such that element 1022 is shifted to the left, and a portion of element 1023 is also shown as a result of the left-scrolling gesture.

Figure 11B:
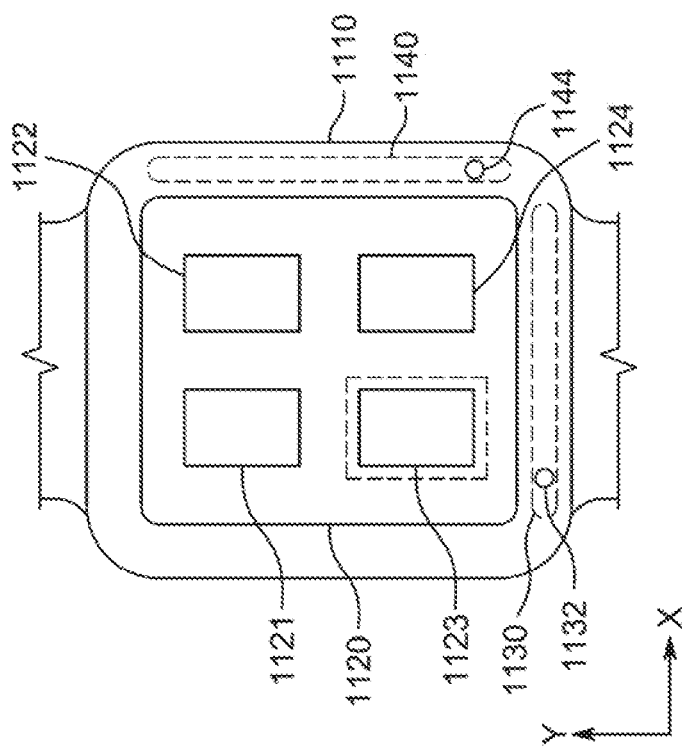
FIGS. 11A and 11B show illustrative screen shots of displayed content being selected in response to user inputs on two capacitive interface regions of an exemplary electronic device according to various embodiments.
Figure 11A:
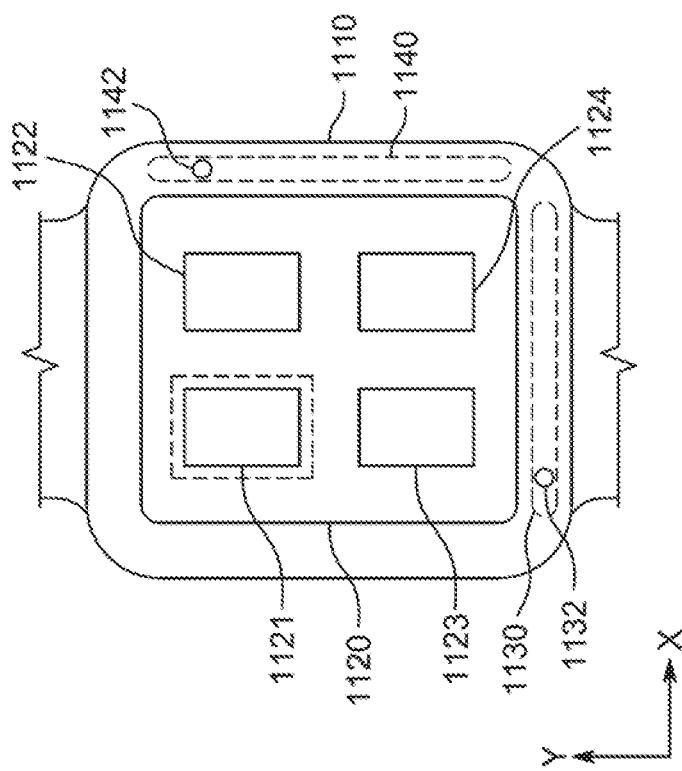

FIGS. 11A and 11B show illustrative screen shots of displayed content being selected in response to user inputs on two capacitive interface regions of a device according to various embodiments. Both of FIGS. 11A and 11B show housing 1110, touchscreen 1120, x-axis capacitive interface region 1130 of housing 1110, and y-axis capacitive interface region 1140 of housing 1110. Content elements 1121-1124 can be arranged in an 2×2 array on touchscreen 1120. The user can select any of elements 1121-1124 by interacting with the appropriate x-y position equivalent of regions 1130 and 1140. For example, if the user wishes to select content element 1121, he can simultaneously touch down at location 1132 on region 1130 that may extend adjacent to or parallel to a bottom edge of touchscreen 1120 and at location 1142 on region 1140 that may extend adjacent to or parallel to a right edge of touchscreen 1120. The touch input at location 1132 corresponds to the X-axis position of content element 1121 and the touch input at location 1142 corresponds to the Y-axis position of content element 1121. If the user wishes to select element 1123, for example, he can touch region 1130 at position 1132 and can touch region 1140 at position 1144 (as illustrated in FIG. 11B). Thus, by simultaneously pressing at specific positions on both x and y axis capacitive interface regions 1130 and 1140, the user can select an element or interface with an equivalent x-y position on touchscreen 1120 without actually touching touchscreen 1120.

Figure 12B:
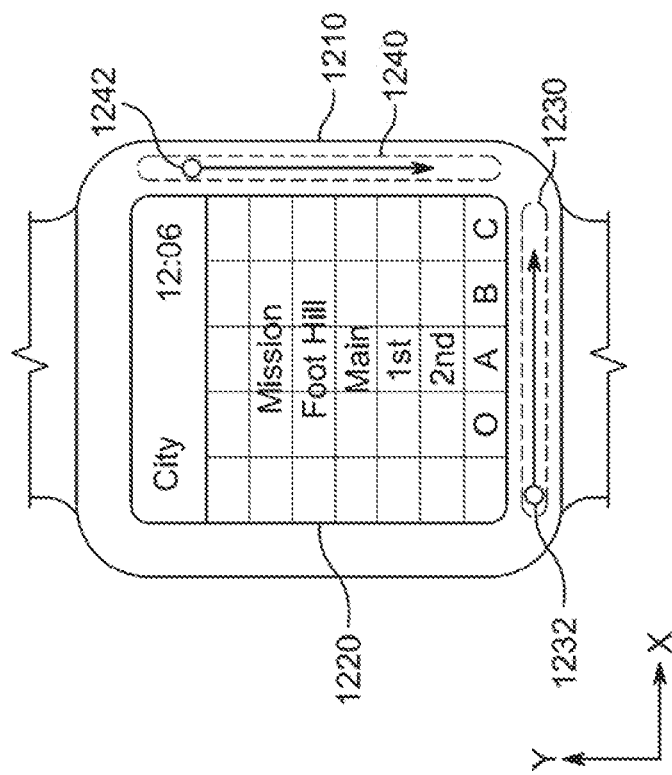
FIGS. 12A-12D show illustrative screen shots of displayed content being navigated in response to user input on one or two capacitive interface regions of an exemplary electronic device according to various embodiments.
Figure 12A:
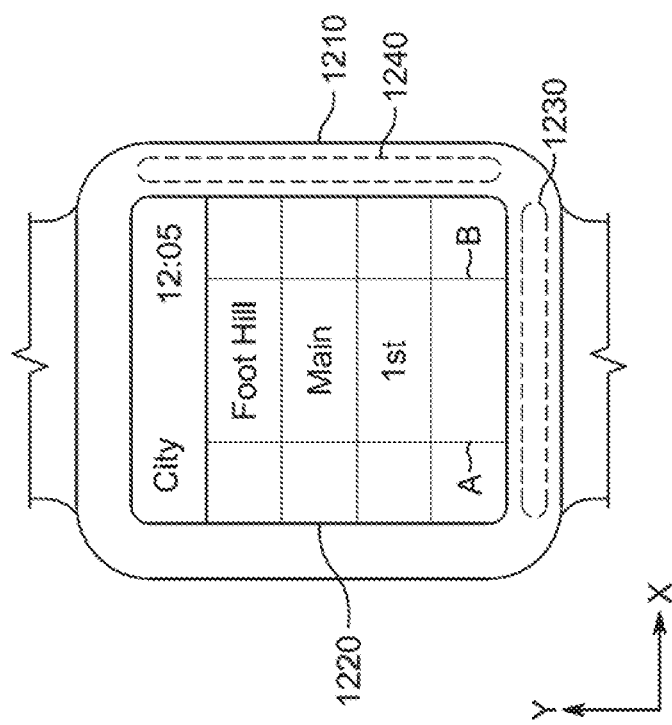
Figure 12D:
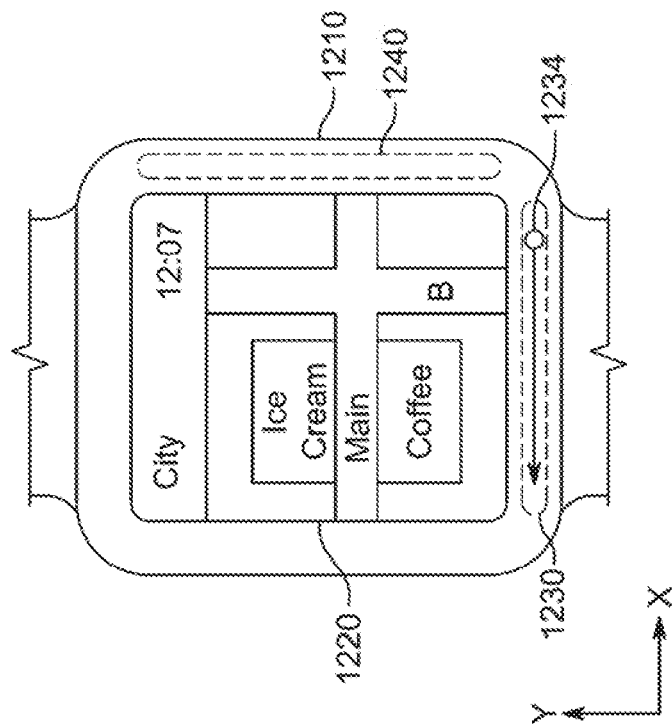
Figure 12C:
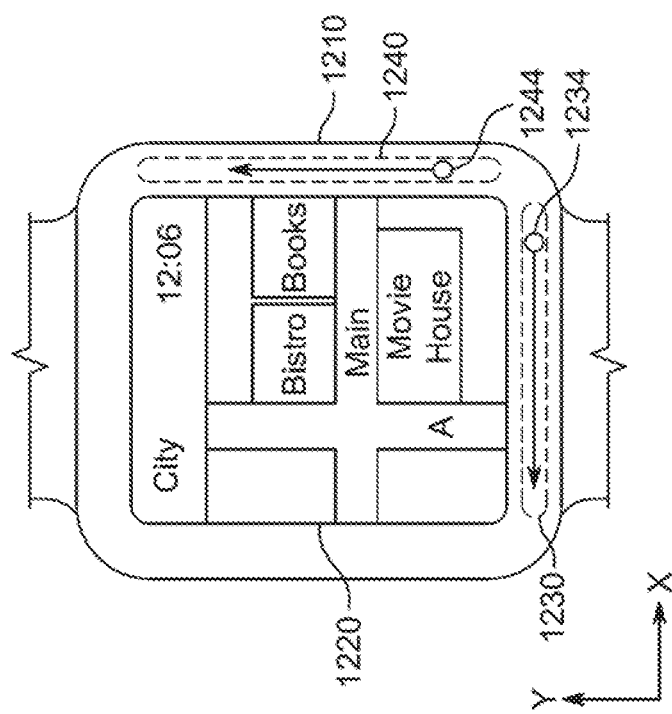

FIGS. 12A-12D show illustrative screen shots in which a user may navigate displayed content in response to input received via one or two capacitive interface regions of a device. FIGS. 12A-12D show housing 1210, touchscreen 1220, x-axis capacitive interface region 1230 of housing 1210, and y-axis capacitive region 1240 of housing 1210. The content displayed on touchscreen 1220 may be a map, for example. Referring now to FIG. 12B, a pinch or zoom-out gesture is being performed in which a user simultaneously touches down at position 1232 of region 1230 that may extend adjacent to or parallel to a bottom edge of touchscreen 1220 and at position 1242 of region 1240 that may extend adjacent to or parallel to a right edge of touchscreen 1220 and drags the touch points closer together, as shown. This gesture can cause the map to zoom out (e.g., from the display content of FIG. 12A to that of FIG. 12B). Referring now to FIG. 12C, an expand or zoom-in gesture is being performed in which a user simultaneously touches down at positions 1234 and 1244 and drags the touch points away from each other, as shown. This gesture can cause the map to zoom in (e.g., from the display content of FIG. 12A to that of FIG. 12C). Referring now to FIG. 12D, an x-axis scroll gesture can be performed in which a user performs a left-scrolling gesture by touching down at position 1234 and scrolling to the left. This gesture can cause the map to be shifted to the left (e.g., from the display content of FIG. 12C to that of FIG. 12D).

FIGS. 13A-13C show illustrative screen shots of displayed content being navigated in response to user input touch events on one or more capacitive interface regions of device according to various embodiments. Each of FIGS. 13A-13C shows housing 1310, touchscreen 1320, and capacitive touch regions 1330 and 1340 of housing 1310. Referring now to FIG. 13A, a single touch event can be received via capacitive touch region 1340 that may extend adjacent to or parallel to a right edge of touchscreen 1320 at position 1342. A single touch event can include a touch down event followed by a lift off event. In response to the single touch event, display element 1322 can be highlighted to show that the user selected that particular display element. A user may be required to single touch region 1340 at position 1342 again to further access the highlighted content.

FIG. 13B shows a double touch event being received at location 1344 on capacitive interface region 1340. A double touch event can include a first touch-down and lift off event followed by a second touch-down and lift off event. In response to the double touch event, display element 1324 can be highlighted first and then a further display action is presented (e.g., the selected program is opened). FIG. 13C shows an extended touch event being received at location 1346 on capacitive interface region 1340. An extended touch event can include a touch down event, a hold down event for a fixed period time, and a lift off event. An extended touch event may cause any number of different user interface experiences to occur. The particular experience may depend on a modality the device is in. For example, if the device is in a home screen, such as that shown in FIG. 13C, the extended press may cause all display elements 1322, 1324, and 1326 to be highlighted or perform a particular animation.

Figure 14:
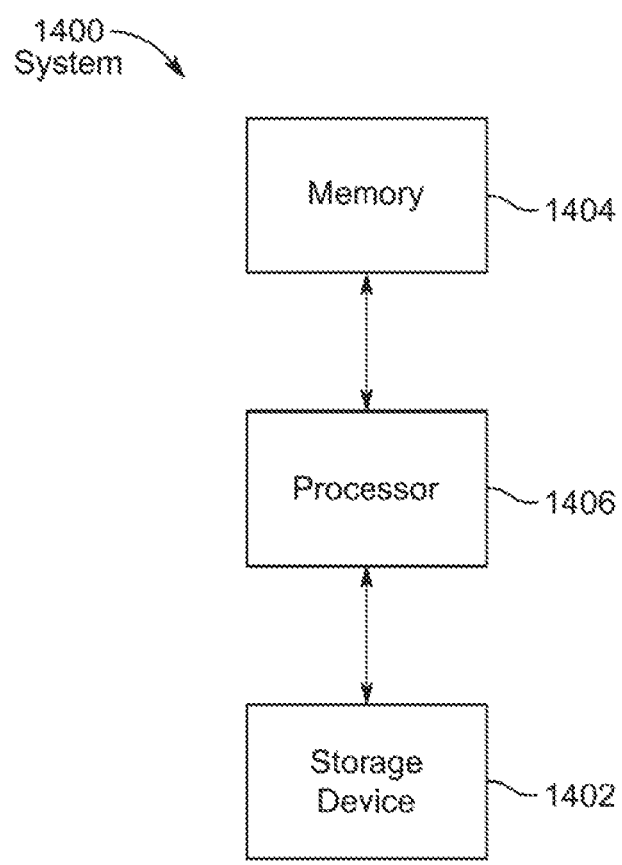
FIG. 14 illustrates an exemplary computing system for modifying a user interface in response to a processed capacitive touch gesture according to various embodiments.

One or more of the functions relating to scaling or scrolling or any other navigation of a user interface of one or more devices of this disclosure can be performed by a system similar or identical to system 1400 shown in FIG. 14. System 1400 can include instructions stored in a non-transitory computer-readable storage medium, such as memory 1404 or storage device 1402, and executed by processor 1406. The instructions can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium that can contain or store the program for use by or in connection with the instruction execution system, apparatus, or device. The non-transitory computer-readable storage medium can include, but is not limited to, an electronic, magnetic, optical, electromagnetic, infrared, or semiconductor system, apparatus or device, a portable computer diskette (magnetic), a random access memory (RAM), a read-only memory (ROM), an erasable programmable read-only memory (EPROM) (magnetic), a portable optical disc, such a CD, CD-R, CD-RW, DVD, DVD-R, or DVD-RW, or flash memory, such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate, or transport the program for use by or in connection with the instruction execution system, apparatus, or device. The transport medium can include, but is not limited to, an electronic, magnetic, optical, electromagnetic, or infrared wired or wireless propagation medium.

In some examples, system 1400 can be included within any one of devices 100, 200, 300, 500, and 600. In these examples, processor 1406 can be used as processor 730. Processor 1406 can be configured to receive the output from encoder 720, button(s) 750, and from touch-sensitive display 740. Processor 1406 can process these inputs as described above with respect to FIGS. 8-13C, and any processes described herein. It is to be understood that the system is not limited to the components and configuration of FIG. 14, but can include other or additional components in multiple configurations according to various examples.

Many alterations and modifications of the preferred embodiments will no doubt become apparent to a person of ordinary skill in the art after having read the foregoing description, it is to be understood that the particular embodiments shown and described by way of illustration are in no way intended to be considered limiting. Thus, references to the details of the described embodiments are not intended to limit their scope.

What is claimed is:

1. A wearable electronic device, comprising:
a housing defining a circular opening;
a processor positioned within the housing;
a display exposed within the circular opening; and
a first capacitive interface region positioned outside and adjacent to the display;
wherein the processor is configured to process rotational inputs received along the first capacitive interface region and scroll an image on the display in response to the rotational inputs;
wherein the display is touch-sensitive, and wherein the processor is configured to process touch inputs simultaneously received along the touch-sensitive display to zoom content on the display.

2. The wearable electronic device of claim 1, wherein the processor is further configured to process one or more tap inputs received along the first capacitive interface region and perform an operation in response to the processed one or more tap inputs.

3. The wearable electronic device of claim 1, wherein the processor is further configured to process gesture inputs received along the first capacitive interface region and perform an operation in response to the processed gesture inputs.

4. The wearable electronic device of claim 1, wherein the processor is further configured to process one or more hold down inputs received along the first capacitive interface region and perform an operation in response to the processed hold down inputs.

5. The wearable electronic device of claim 4, wherein the processor is further configured to process the one or more hold down inputs in accordance with a duration of the one or more hold down inputs.

6. The wearable electronic device of claim 1, wherein the first capacitive interface region encircles an entire periphery of the display.

7. The wearable electronic device of claim 1, wherein the processor is further configured to process the rotational inputs in accordance with a speed of the rotational inputs.

8. The wearable electronic device of claim 1, wherein:
the housing is constructed from a non-metallic material;
the wearable electronic device further comprises a capacitive touch sensor; and
the capacitive touch sensor is positioned directly against the first capacitive interface region.

9. The wearable electronic device of claim 1, wherein:
the housing is constructed from a metallic material; and
the wearable electronic device further comprises:
a capacitive touch sensor; and
a non-capacitive component placed between the first capacitive interface region and the capacitive touch sensor.

10. An electronic device, comprising:
a processor;
a display operatively coupled to the processor;
a housing encompassing the processor and defining a circular aperture that exposes a portion of the display; and
one or more capacitive touch interface regions positioned outside and adjacent to the display;
the processor operative to process touch events on the one or more capacitive touch interface regions and to alter a display of content on the display in response to the processed touch events;
wherein the processor is further operative to selectively zoom the display of content on the display in response to one or more processed touch events on the one or more capacitive touch interface regions.

11. The electronic device of claim 10, wherein the first capacitive touch interface region encircles an entire periphery of the display.

12. The electronic device of claim 10, wherein the processor is further operative to scroll an image on the display in response to the rotational touch events.

13. The electronic device of claim 10, wherein the processor is further operative to perform an operation in response to one or more hold down inputs received along the first capacitive touch interface region.

14. The electronic device of claim 10, wherein the processor is operative to selectively highlight content on the display in response to the processed rotational touch events.

15. The electronic device of claim 10, wherein the processor is operative to selectively move content on the display along one or more axes on the display in response to the processed rotational touch events.

* * * * *